US012247414B2

(12) United States Patent
Varadaraju et al.

(10) Patent No.: US 12,247,414 B2
(45) Date of Patent: Mar. 11, 2025

(54) LEVER HANDING SELECTION

(71) Applicant: Schlage Lock Company LLC, Carmel, IN (US)

(72) Inventors: Nagesh Varadaraju, Bangalore (IN); Vijayakumar Mani, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 553 days.

(21) Appl. No.: 17/021,122

(22) Filed: Sep. 15, 2020

(65) Prior Publication Data

US 2022/0081932 A1 Mar. 17, 2022

(51) Int. Cl.

*E05B 3/00* (2006.01)
*E05B 1/00* (2006.01)
*E05B 15/00* (2006.01)
*E05B 13/00* (2006.01)
*E05B 63/04* (2006.01)

(52) U.S. Cl.

CPC ................ *E05B 3/00* (2013.01); *E05B 1/003* (2013.01); *E05B 15/0033* (2013.01); *E05B 63/04* (2013.01)

(58) Field of Classification Search

CPC ... Y10T 292/82; Y10T 292/93; Y10T 292/96; E05B 63/04; E05B 2015/0413; E05B 3/00; Y10S 292/55; Y10S 292/60

See application file for complete search history.

(56) References Cited

U.S. PATENT DOCUMENTS 2,226,499 A * 12/1940 Ledin ...................... E05C 1/163 70/216
2,729,485 A * 1/1956 Schlage .................. E05B 3/065 267/180
4,728,133 A * 3/1988 Valley ...................... E05B 3/06 292/DIG. 60
6,491,327 B1 * 12/2002 Fan ......................... E05B 3/065 292/336.3
7,178,373 B2 * 2/2007 Shen ................... E05B 17/0062 292/169.22
9,790,713 B2 10/2017 Mani et al.
2014/0001772 A1 * 1/2014 Mani ................... E05B 63/0056 292/173
2016/0201354 A1 7/2016 Lehner, Jr. et al.
2018/0030760 A1 2/2018 Mani et al.

FOREIGN PATENT DOCUMENTS

CN 107675942 A * 2/2018
WO WO-2017183056 A1 * 10/2017 ............. E05B 15/02

OTHER PUBLICATIONS

Translation of the CN107675942 Feb. 9, 2018.*

* cited by examiner

*Primary Examiner* — Carlos Lugo
(74) *Attorney, Agent, or Firm* — Taft Stettinius & Hollister LLP

(57) ABSTRACT

An handleset including a housing, a spring cage assembly, a spindle, and a lever handle. The spring cage assembly includes a spring cage rotatably mounted in the housing, and a bias mechanism biasing the spring cage toward a home position. The spindle extends along a longitudinal axis, and is longitudinally movable between an engaged position in which the spindle is rotationally coupled with the spring cage and a disengaged position in which the spindle is rotationally decoupled from the spring cage. The lever handle is rotationally coupled with the spindle, and the spindle is slidable relative to the lever handle between the engaged position and the disengaged position.

24 Claims, 8 Drawing Sheets

LEVER HANDING SELECTION

TECHNICAL FIELD

The present disclosure generally relates to handlesets, and more particularly but not exclusively relates to systems and methods for selection and/or adjustment of the handing of a lever handle.

BACKGROUND

Handlesets including lever handles typically provide a mechanism by which the handing of the lever can be selected or adjusted, often between right-handed and left-handed orientations. Many current approaches to lever handing adjustment suffer from drawbacks and limitations. For example, certain existing handlesets require a specialized tool for handing selection. Should the tool be lost or thrown away, it may be difficult or impossible to adjust the lever handing. Additionally, certain existing systems require that the handle be removed from the handleset and reinstalled in the new orientation, a process that can be difficult and/or time-consuming. For these reasons among others, there remains a need for further improvements in this technological field.

SUMMARY

An exemplary handleset includes a housing, a spring cage assembly, a spindle, and a lever handle. The spring cage assembly includes a spring cage rotatably mounted in the housing, and a bias mechanism biasing the spring cage toward a home position. The spindle extends along a longitudinal axis, and is longitudinally movable between an engaged position in which the spindle is rotationally coupled with the spring cage and a disengaged position in which the spindle is rotationally decoupled from the spring cage. The lever handle is rotationally coupled with the spindle, and the spindle is slidable relative to the lever handle between the engaged position and the disengaged position. Further embodiments, forms, features, and aspects of the present application shall become apparent from the description and figures provided herewith.

DETAILED DESCRIPTION OF ILLUSTRATIVE EMBODIMENTS

Figure 1:
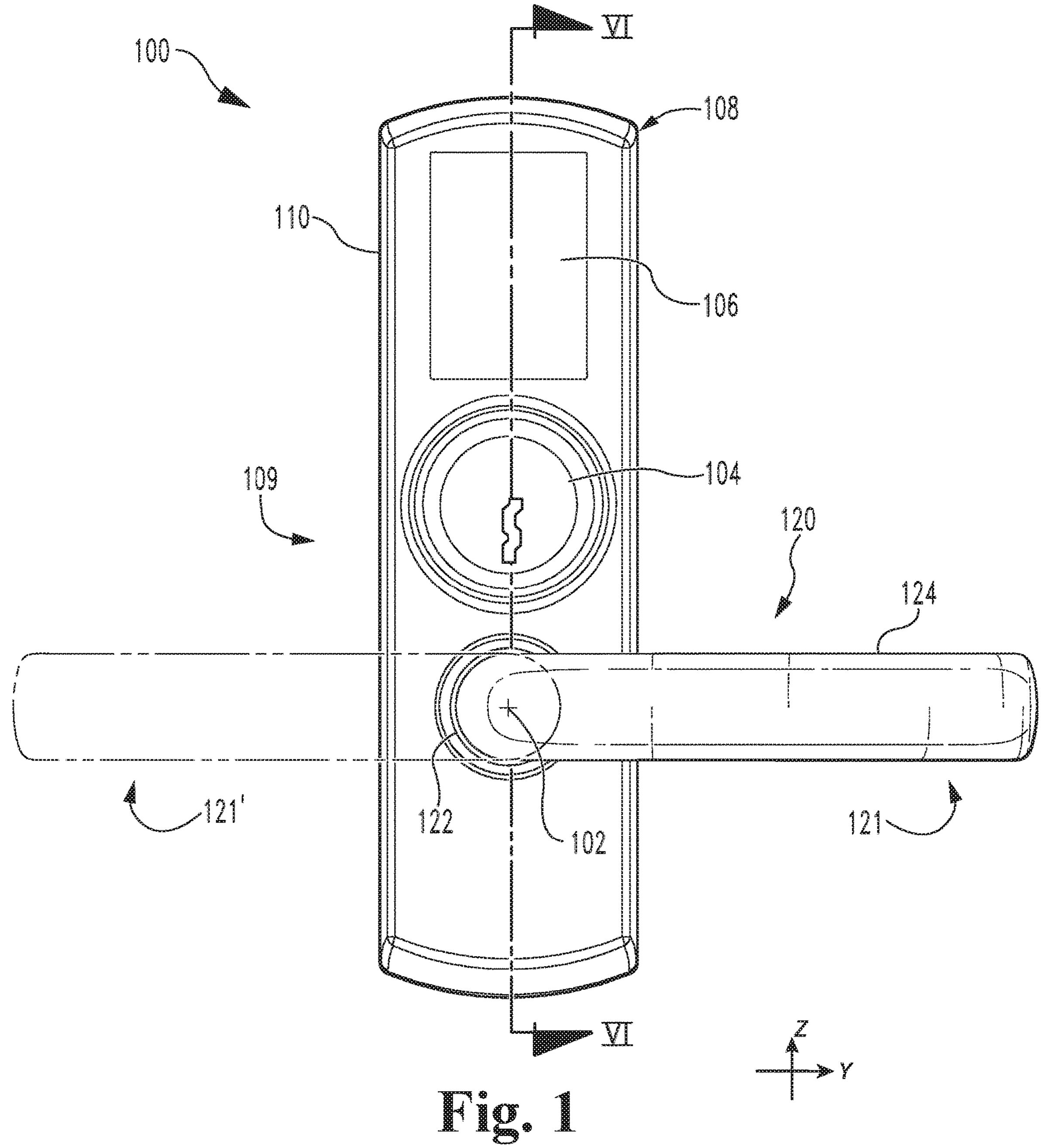
FIG. 1 is a front view of a handleset according to certain embodiments.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 2, the X-axis defines first and second longitudinal directions, the Y-axis defines first and second lateral directions, and the Z-axis defines first and second transverse directions. Additionally, the first and second longitudinal directions may be referred to herein as the proximal direction (to the left and downward in FIG. 2) and the distal direction (to the right and upward in FIG. 2). These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of “A, B, and/or C” can also mean (A); (B); (C); (A and B); (B and C); (A and C); or (A, B, and C). Further, with respect to the claims, the use of words and phrases such as “a,” “an,” “at least one,” and/or “at least one portion” should not be interpreted so as to be limiting to only one such element unless specifically stated to the contrary, and the use of phrases such as “at least a portion” and/or “a portion” should be interpreted as encompassing both embodiments including only a portion of such element and embodiments including the entirety of such element unless specifically stated to the contrary.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

With reference to FIG. 1, illustrated therein is a handleset 100 according to certain embodiments. The handleset 100 generally includes a housing 110 and a lever handle 120 rotatably mounted to the housing 110 for rotation about a longitudinal axis 102. The handleset 100 has a rear side 108 configured for abutting the face of a door and an opposite front side 109 configured for facing a user of the door. In certain embodiments, the handleset 100 may further include a lock cylinder 104 and/or a credential reader 106, each of which may be mounted to the housing 110 and accessible from the front side 109 of the handleset 100.

As described in further detail below, the lever handle 120 generally includes a shank 122 that extends along the longitudinal axis 102 and a lever portion 124 that extends from the shank 122 in a direction transverse to the longitudinal axis 102. In the configuration illustrated in FIG. 1, the lever handle 120 is mounted in a first orientation 121 in which the lever portion 124 extends from the shank 122 in a first direction. As described herein, the handleset 100 includes features and mechanisms that enable the lever handle 120 to be quickly and easily adjusted between the first orientation 121 and a second orientation 121', in which the lever portion 124 extends in a second direction different from the first direction. In the illustrated form, the first orientation is a right-handed orientation in which the lever portion 124 extends from the shank 122 in a rightward direction as viewed from the front side 109, and the second orientation 121' is a left-handed orientation in which the lever portion 124 extends from the shank 122 in a leftward direction as viewed from the front side 109. As described in further detail below, it is also contemplated that additional and/or alternative orientations may be selected according to the systems and methods described herein.

Figure 2:
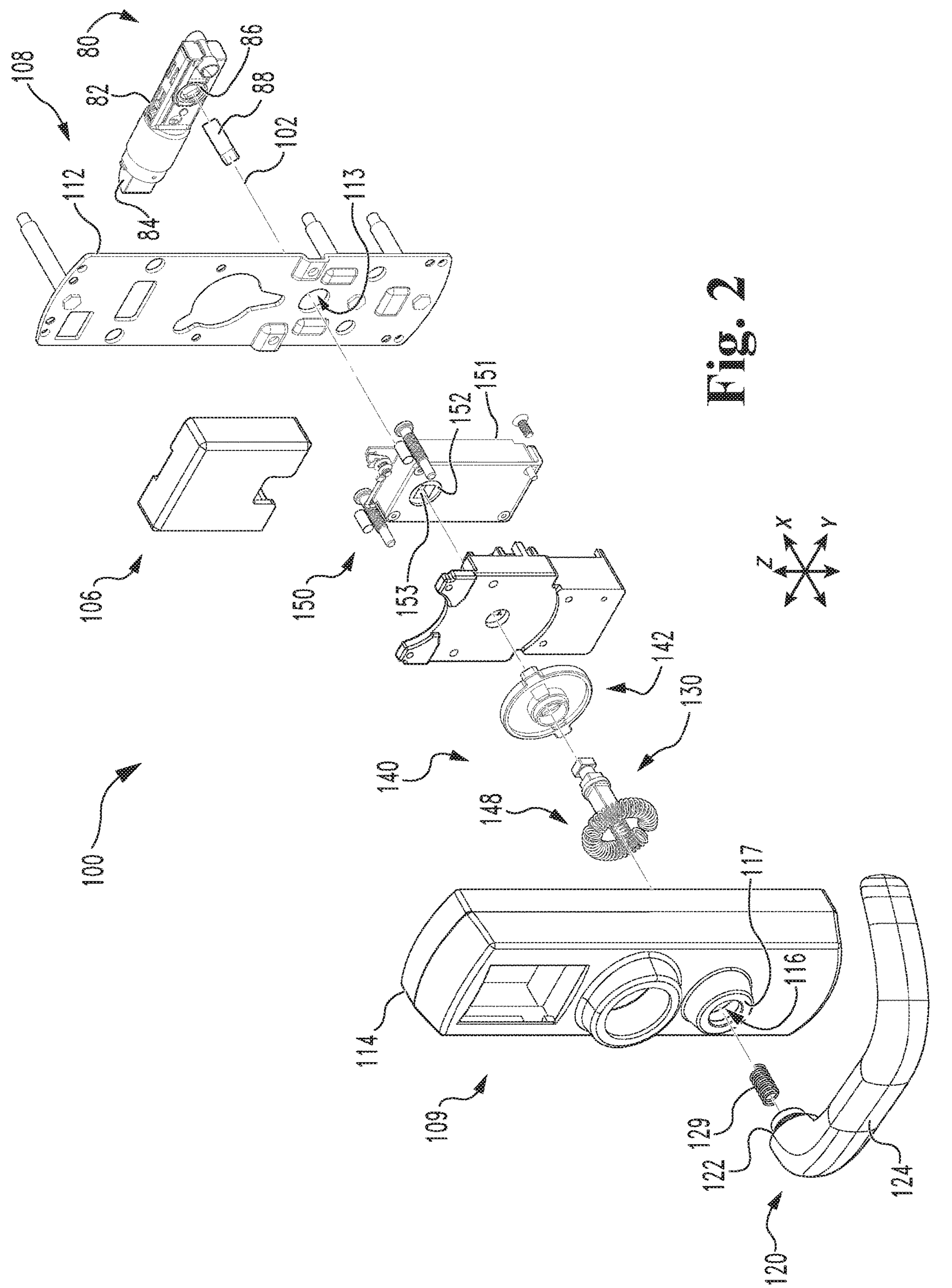
FIG. 2 is a first exploded assembly view of the handleset illustrated in FIG. 1.
Figure 3:
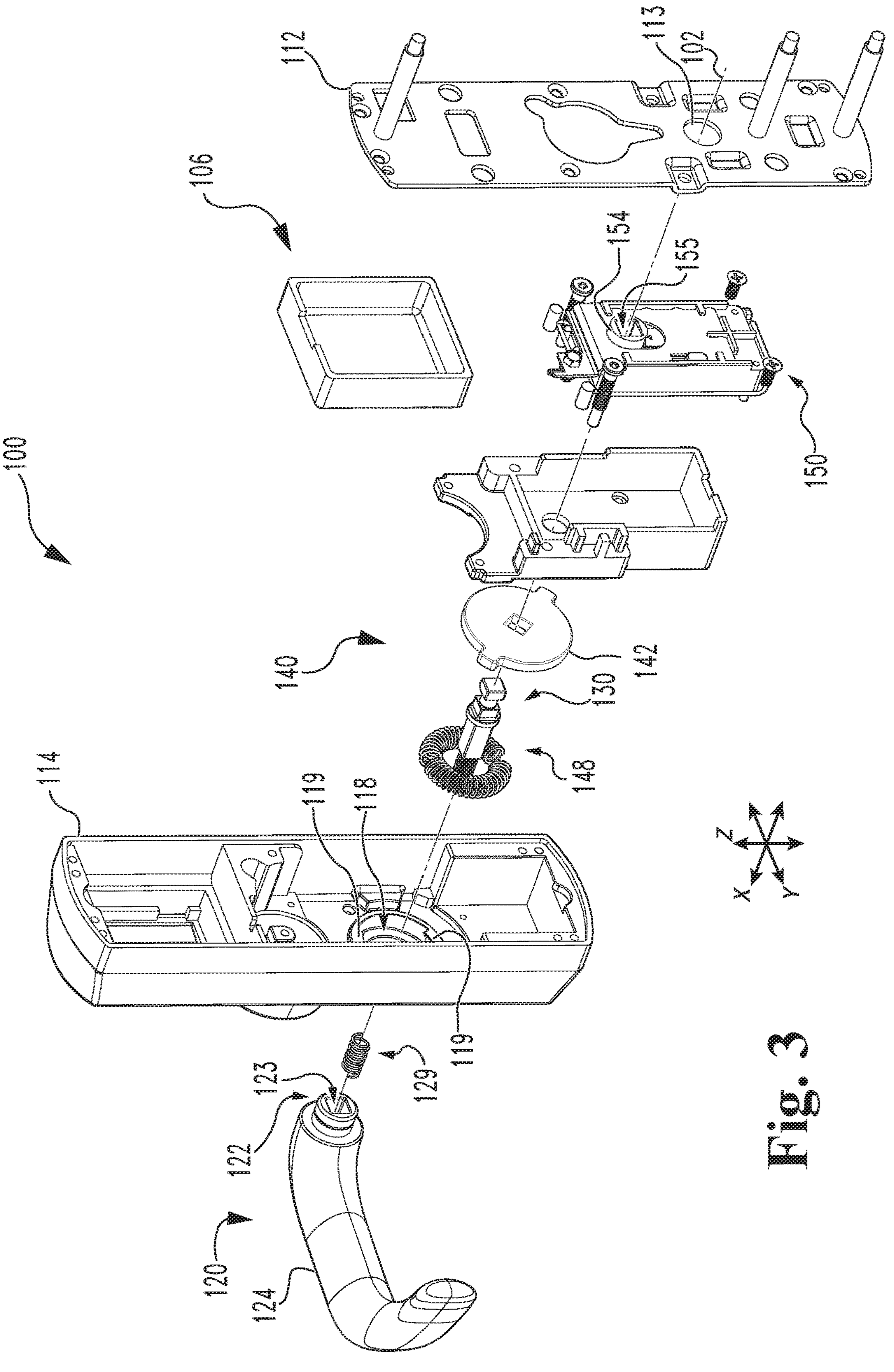
FIG. 3 is a second exploded assembly view of the handleset illustrated in FIG. 1.

With additional reference to FIGS. 2 and 3, the handleset 100 further includes a spindle 130 engaged with the shank 122 of the lever handle 120, a spring cage assembly 140 positioned in the housing 110 and operable to bias the lever handle 120 toward the selected orientation, and an actuation assembly 150 positioned in the housing 110 and configured for connection with a latch mechanism 80. As described herein, the spindle 130 selectively engages the lever handle 120 with each of the spring cage assembly 140 and the actuation assembly 150.

The illustrated latch mechanism 80 generally includes a housing 82, a latchbolt 84 movably mounted in the housing 82, and a retractor 86 movably mounted in the housing 82 and engaged with the latchbolt 84. The retractor 86 is configured for connection with the actuation assembly 150, for example via a drive spindle 88, and is configured to retract the latchbolt 84 when rotated from a home position. As described herein, such rotation of the retractor 86 may selectively be transmitted from the handle 120 by the actuation assembly 150.

The housing 110 generally includes a backplate 112 and an escutcheon 114 mounted to the backplate 112 such that the housing 110 defines a chamber in which various internal components of the handleset 100 are positioned. The backplate 112 includes an opening 113 through which the actuation assembly 150 may be connected to the latch mechanism 80, for example via a drive spindle 88 that extends through the opening 113. As described herein, the backplate opening 113 may also facilitate adjustment of the handleset 100 between a plurality of handing orientations including at least a first handing orientation and a second handing orientation. The escutcheon 114 includes an opening 116 that is surrounded by an annular flange 117, which aids in the mounting of the lever handle 120 to the housing 110 as described herein. Positioned near the opening 116 on a distal side of the escutcheon 114 is a generally circular recess 118 including one or more projections 119. As described herein, the projection(s) 119 provide anchor points for a bias mechanism 148 of the spring cage assembly 140 to aid the spring cage assembly 140 in exerting a biasing force urging the lever handle 120 toward a home position corresponding to the selected orientation.

The lever handle 120 generally includes the shank 122, which extends along the longitudinal axis 102, and the lever portion 124, which extends from the shank 122 in a direction transverse to the longitudinal axis 102. The illustrated shank 122 includes a cavity 123 in which a proximal end portion 131 of the spindle 130 is slidably received, and a bias element such as a spring 129 is seated in the cavity 123 between the spindle 130 and an end wall of the cavity 123 such that the spring 129 longitudinally biases the spindle 130 in the distal direction. In the illustrated form, the spring 129 is provided as a compression spring. It is also contemplated that the spring 129 may be provided as another form of biasing member, such as a torsion spring, a leaf spring, an extension spring, one or more magnets, and/or an elastic member.

Figure 4:
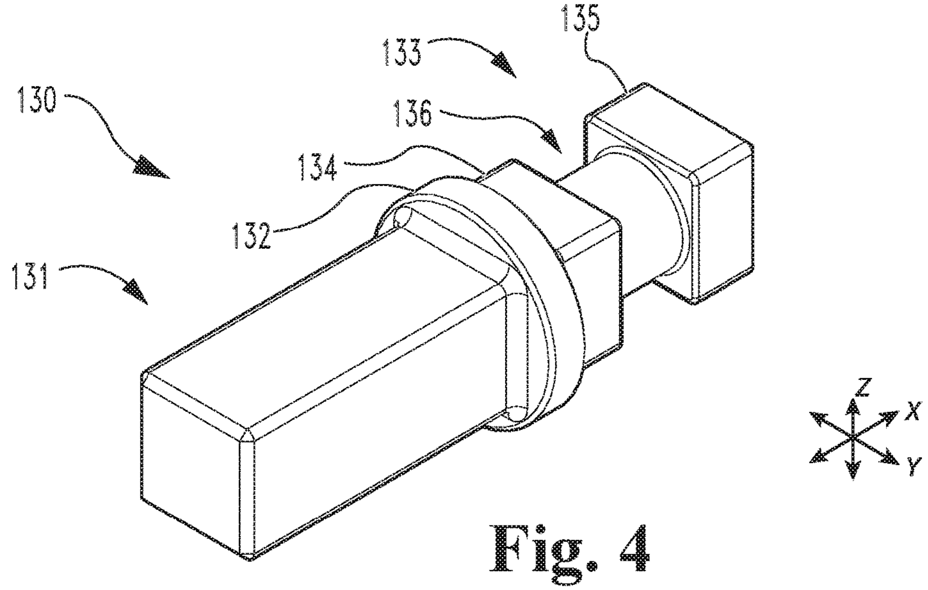
FIG. 4 is a perspective view of a spindle according to certain embodiments.

With additional reference to FIG. 4, the spindle 130 generally includes a proximal end portion 131 and a distal end portion 133 opposite the proximal end portion 131, and may further include a collar 132 formed between the proximal end portion 131 and the distal end portion 133. The proximal end portion 131 is slidably engaged with the shank 122 for movement between a proximal disengaged position and a distal engaged position, and is distally biased toward the engaged position by the spring 129 or other bias mechanism. The proximal end portion 131 is also rotationally coupled with the shank 122. More particularly, the cross-sectional geometry of the proximal end portion 131 is configured for rotational coupling with the cross-sectional geometry of the cavity 123 such that the proximal end portion 131 slidingly mates with the cavity 123. In the illustrated form, the shank 122 defines the cavity 123, and the proximal end portion 131 is slidably received in the cavity 123. It is also contemplated that the proximal end portion 131 may define a cavity, and the shank 122 may project into the spindle cavity to rotationally couple the handle 120 with the spindle 130 while permitting for sliding movement of the spindle 130 relative to the shank 122.

The distal end portion 133 generally includes a proximal or first engagement section 134 configured for engagement with a spring cage 142 of the spring cage assembly 140, a distal or second engagement section 135 configured for engagement with an actuator 152 of the actuation assembly 150, and an intermediate disengagement section 136 positioned between the first engagement section 134 and the second engagement section 135. Each of the proximal end portion 131, the first engagement section 134, and the second engagement section 135 is configured for sliding engagement and rotational coupling with a corresponding component, and has a corresponding and respective non-circular cross-section that facilitates such slidably engagement and rotational coupling. In the illustrated form, each of the proximal end portion 131, the first engagement section 134, and the second engagement section 135 has a substantially square geometry. It is also contemplated that one or more of the proximal end portion 131, the first engagement section 134, and the second engagement section 135 may have a different cross-sectional geometry, such as that of a hexagon or another polygon. The example disengagement section 136 is smaller in cross-section than each of the engagement sections 134, 135, and in the illustrated form has a circular cross-section. It is also contemplated that the disengagement section 136 may have a different cross-sectional geometry.

Figure 5:
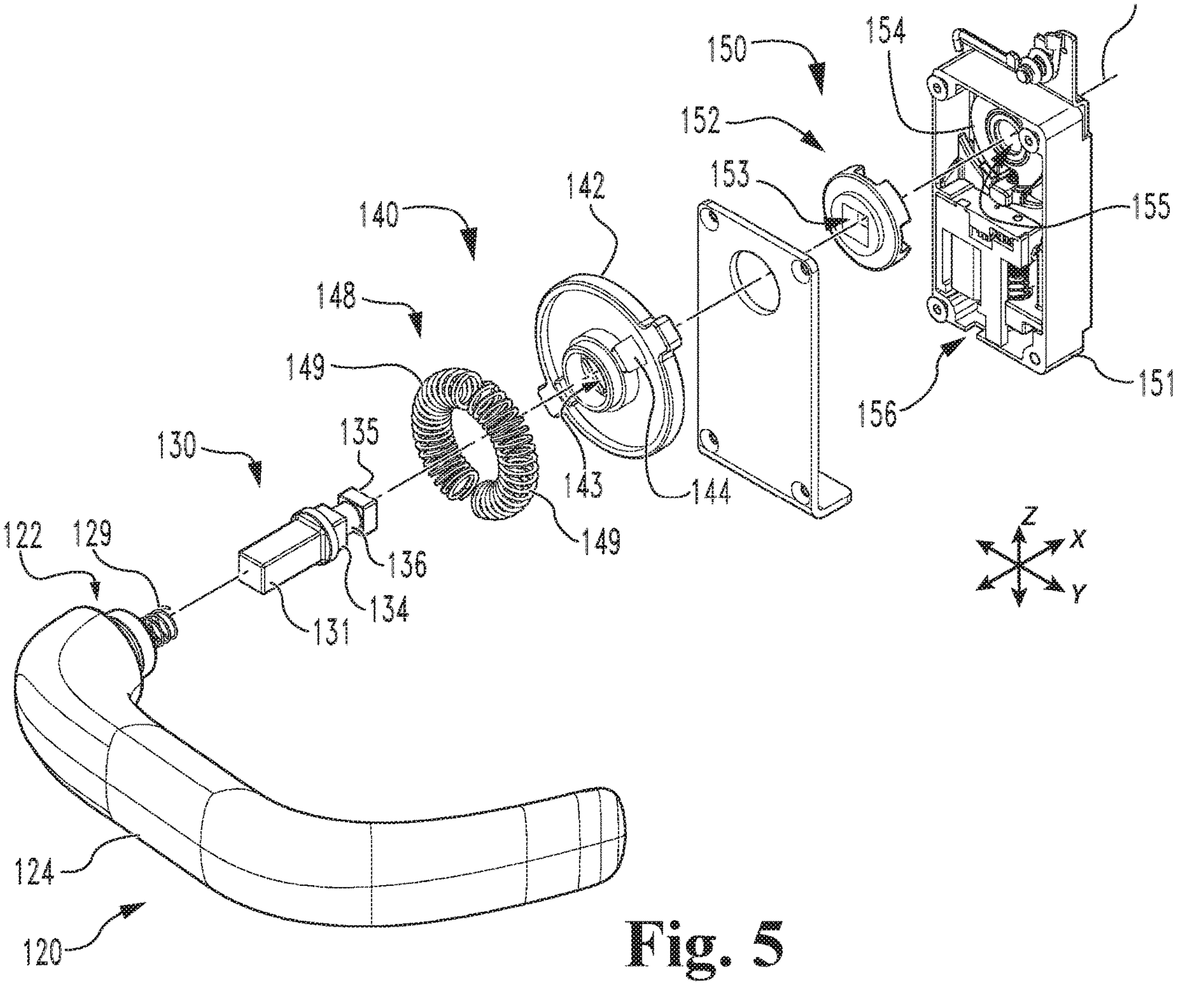
FIG. 5 is an exploded assembly view of a portion of the handleset illustrated in FIG. 1.

With additional reference to FIG. 5, the spring cage assembly 140 is mounted in the housing 110, and generally includes a spring cage 142 and a bias mechanism 148 engaged between the spring cage 142 and the escutcheon 114 such that the bias mechanism 148 biases the spring cage 142 toward a home position. The spring cage 142 includes an opening 143 operable to slidably receive the first or proximal engagement section 134 of the spindle 130 for rotational coupling with the spindle 130, and may further include one or more projections 144 that engage the bias mechanism 148. In the illustrated form, the bias mechanism 148 includes a pair of curved compression springs 149, each of which is engaged between the spring cage projections 144 and the escutcheon projections 119 such that the springs 149 bias the spring cage 142 toward its home position. It is also contemplated that the bias mechanism 148 may take another form, such as one comprising a torsion spring, an extension spring, a leaf spring, an elastic member, and/or magnets. As described herein, the spring cage 142 is one example of a rotatable component that selectively engages the spindle 130.

As noted above, the spring cage opening 143 is configured to slidably receive the first engagement section 134 of the spindle 130. The spring cage opening 143 and the first engagement section 134 are also sized and shaped such that the spindle 130 is rotationally coupled with the spring cage 142 when the first engagement section 134 is received in the spring cage opening 143. In the illustrated form, each of the first engagement section 134 and the spring cage opening 143 has a square cross-sectional geometry. It is also contemplated that other cross-sectional geometries may be utilized, including without limitation other polygonal cross-sectional geometries.

The actuation assembly 150 is mounted in the housing 110, and generally includes a first actuator 152, which is another form of rotatable component that may be selectively coupled with the spindle 130. The actuation assembly 150 may further include a case 151 in which the first actuator 152 is rotatably seated, a second actuator 154 rotatably mounted in the case 151, and a clutch mechanism 156 operable to selectively rotationally couple the first actuator 152 with the second actuator 154. The first actuator 152 includes an opening 153 operable to slidably receive the second or distal engagement section 135 of the spindle 130 for rotational coupling with the spindle 130. The second actuator 154 is positioned distally of the first actuator 152, and is selectively rotatable relative to the first actuator 152. The second actuator 154 includes an opening 155 configured for engagement with the latch mechanism 80 (e.g., via a drive spindle 88 inserted into the opening 155) such that rotation of the second actuator 154 is operable to rotate the retractor 86 to thereby retract the latchbolt 84.

As noted above, the illustrated clutch mechanism 156 is operable to selectively rotationally couple the first actuator 152 with the second actuator 154. When so coupled, rotation of the first actuator 152 causes a corresponding rotation of the second actuator 154 to actuate the latch mechanism 80. The clutch mechanism 156 may be in communication with the credential reader 106 and/or a controller of the handleset 100 such that the clutch mechanism 156 selectively couples the actuators 152, 154 when a valid credential is presented to the credential reader 106 to thereby unlock the handleset 100. While the illustrated actuation assembly 150 includes a second actuator 154 and a clutch mechanism 156 operable to selectively rotationally couple the first actuator 152 with the second actuator 154 to enable the spindle 130 to actuate the latch mechanism 80, it is also contemplated that the second actuator 154 and the clutch mechanism 156 may be omitted, for example in embodiments in which the first actuator 152 is rotationally coupled with the drive spindle 88 for actuation of the latch mechanism 80.

As indicated above, the first actuator opening 153 is configured to slidably receive the second engagement section 135 of the spindle 130. The first actuator opening 153 and the second engagement section 135 are also sized and shaped such that the spindle 130 is rotationally coupled with the first actuator 152 when the second engagement section 135 is received in the opening 153. In the illustrated form, each of the second engagement section 135 and the first actuator opening 153 has a square cross-sectional geometry. It is also contemplated that other cross-sectional geometries may be utilized, including without limitation other polygonal cross-sectional geometries.

Figure 6:
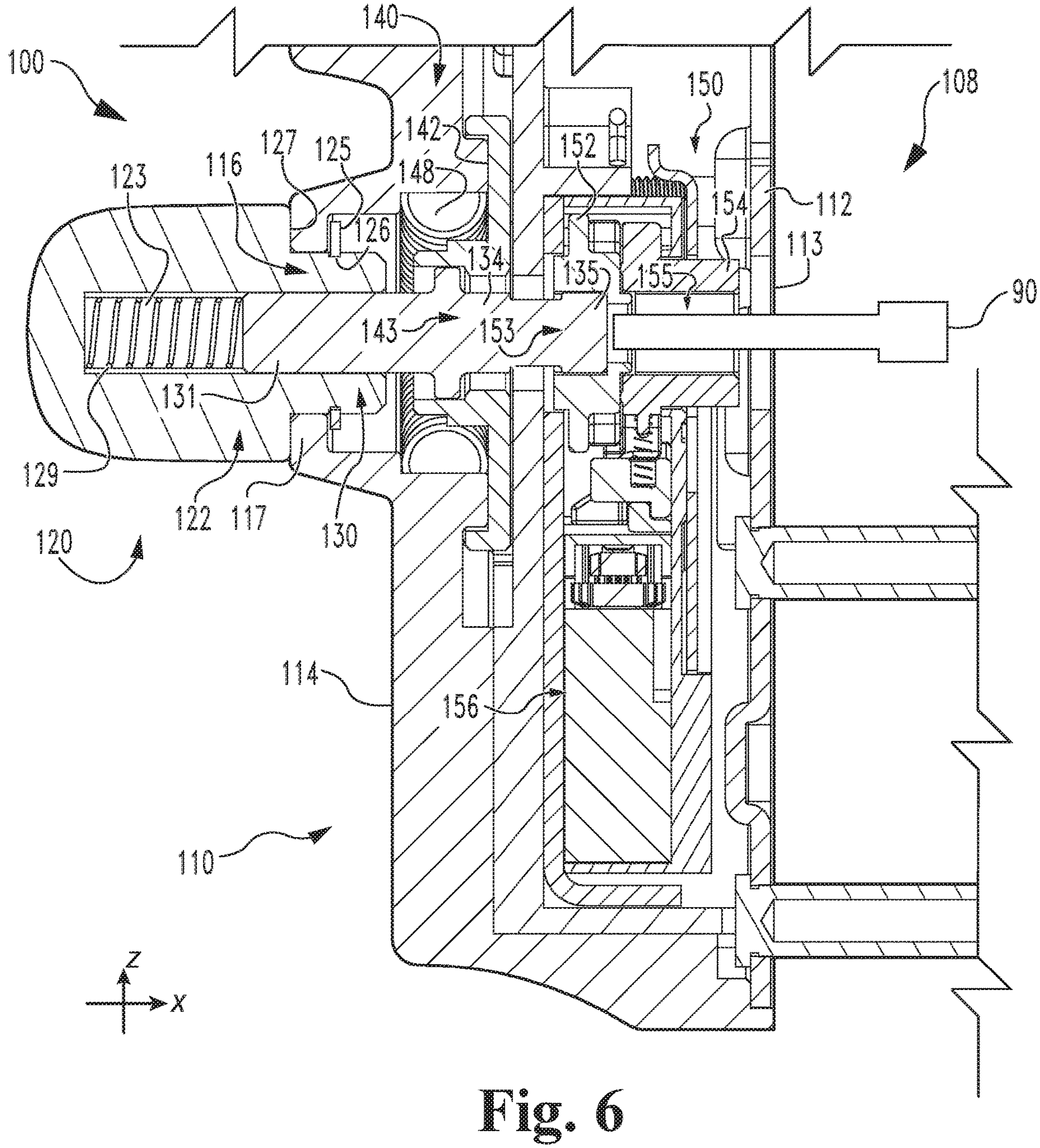
FIG. 6 is a cross-sectional view taken along the line VI-VI of FIG. 1.

With additional reference to FIG. 6, illustrated therein is a cross-sectional view of a portion of the handleset 100 taken along the line VI-VI in FIG. 1. As can be seen from this view, a portion of the shank 122 projects through the escutcheon opening 116 such that the lever handle 120 is rotatably mounted to the escutcheon 114. A circlip 125 may be seated in a groove 126 formed in the shank 122 such that the annular flange 117 is captured between the circlip 125 and a shoulder 127 of the shank 122, thereby longitudinally coupling the lever handle 120 with the housing 110 while permitting rotation of the handle 120 relative to the housing 110. In the illustrated form, the proximal end portion 131 of the spindle 130 is received in the cavity 123, and the spring 129 biases the spindle 130 toward a distal engaged position. As described herein, a tool 90 such as a screwdriver or another elongated member can be inserted through the rear side 108 of the handleset 100 to move the spindle 130 against the biasing force of the spring 129 toward a proximal disengaged position.

Figure 7:
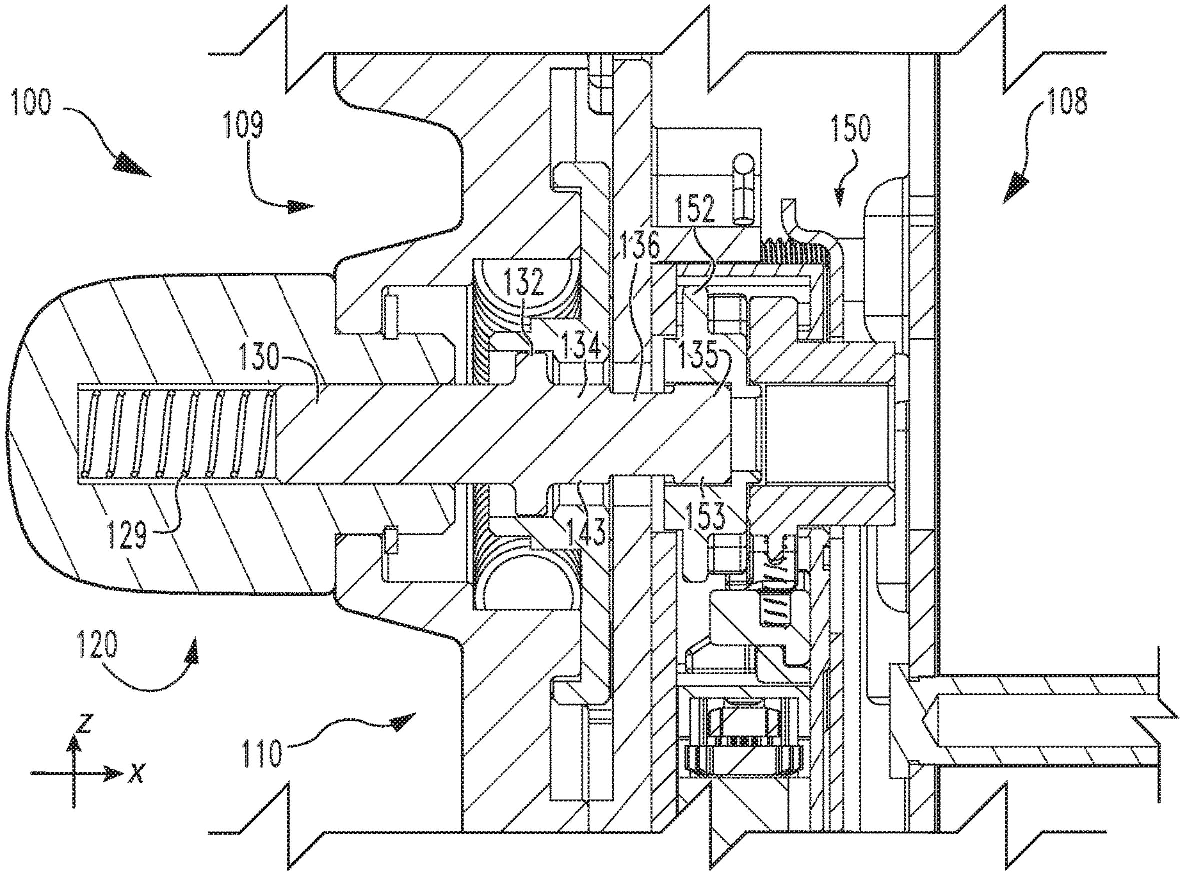
FIG. 7 is a cross-sectional view similar to that of FIG. 6, and illustrates a portion of the handleset when the handleset is in an engaged condition.
Figure 8:
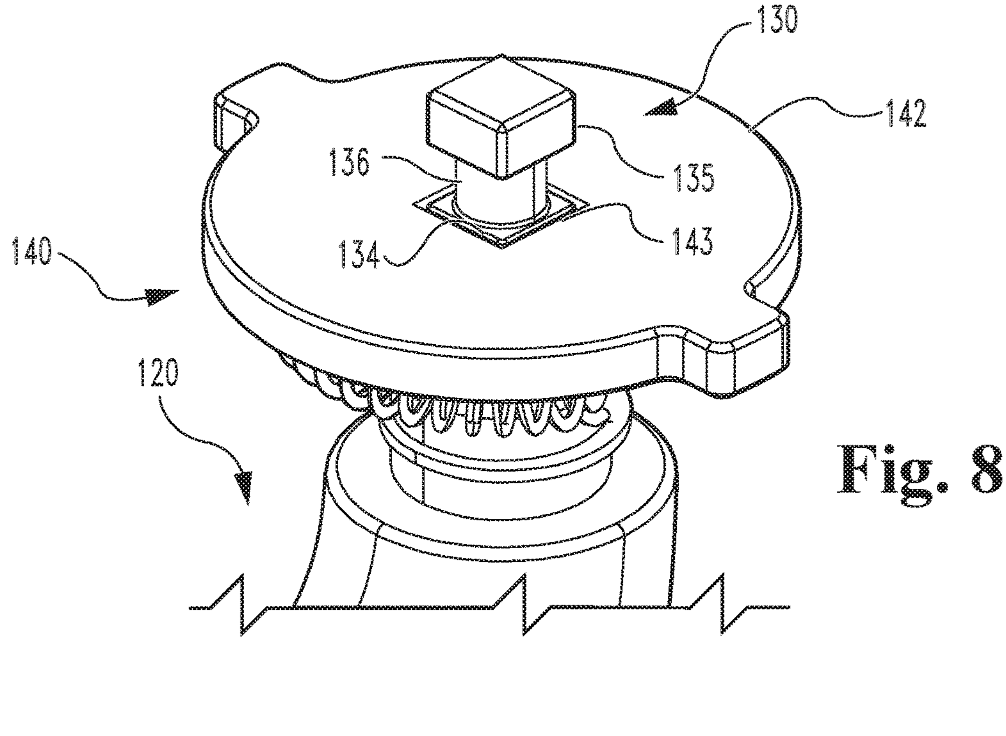
FIG. 8 is a perspective illustration of a portion of the handleset when the handleset is in the engaged condition.

With additional reference to FIGS. 7 and 8, illustrated therein are portions of the handleset 100 when the handleset 100 is in an engaged condition, in which the spindle 130 is in the distal engaged position to which it is biased by the spring 129. In this condition, the first or proximal engagement section 134 is received in the spring cage opening 143 such that the spindle 130 is rotationally coupled with the spring cage 142. As a result, the spring cage assembly 140 biases the lever handle 120 toward a home position, which corresponds to the selected orientation for the handle 120. Additionally, the second or distal engagement section 135 is received in the first actuator opening 153 such that the spindle 130 is rotationally coupled with the first actuator 152. As a result, rotation of the handle 120 causes a corresponding rotation of the first actuator 152. When the handleset 100 is in an unlocked state, the clutch mechanism 156 rotationally couples the first actuator 152 with the second actuator 154 such that rotation of the first actuator 152 by the lever handle 120 is operable to actuate the latch mechanism 80 as described above. When the handleset 100 is in a locked state, the clutch mechanism 156 rotationally decouples the first actuator 152 from the second actuator 154 such that the handle 120 is inoperable to actuate the latch mechanism 80.

Figure 9:
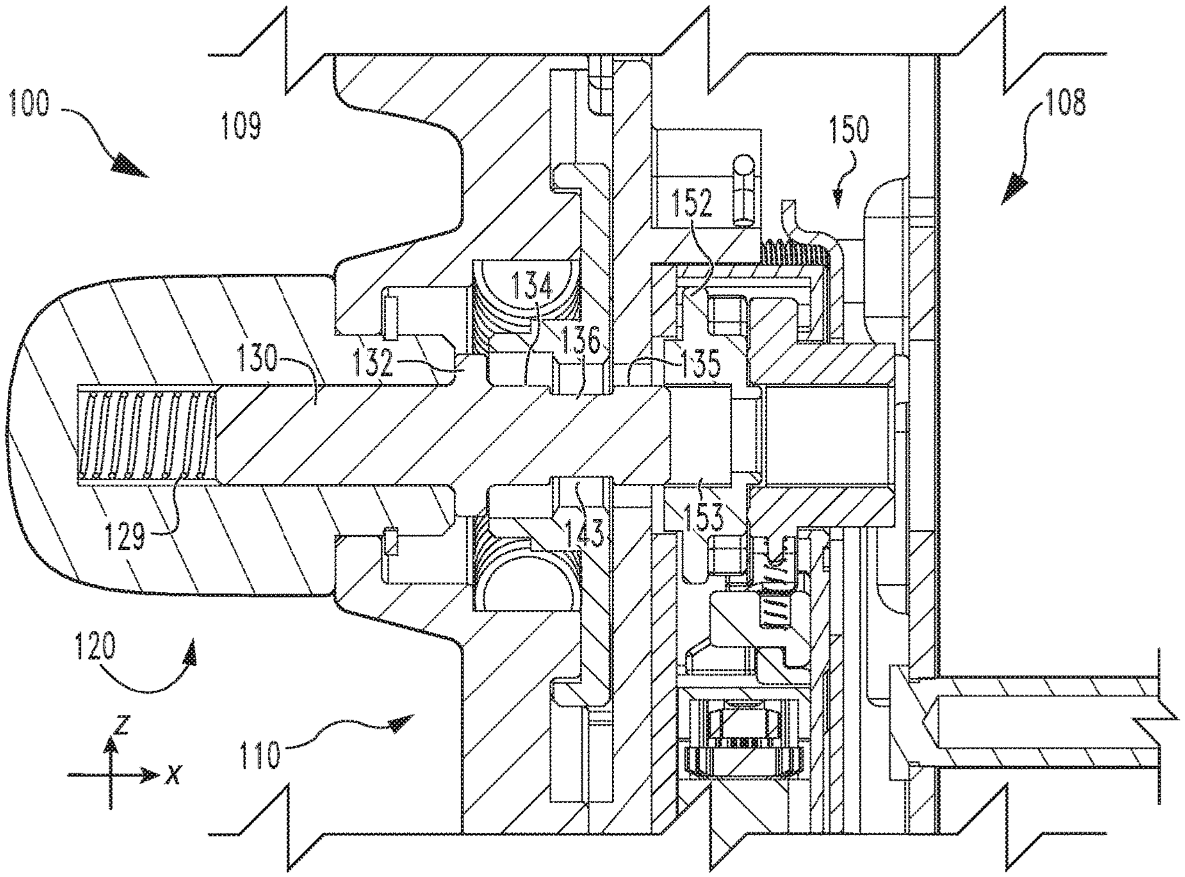
FIG. 9 is a cross-sectional view similar to that of FIG. 6, and illustrates a portion of the handleset when the handleset is in a disengaged condition.
Figure 10:
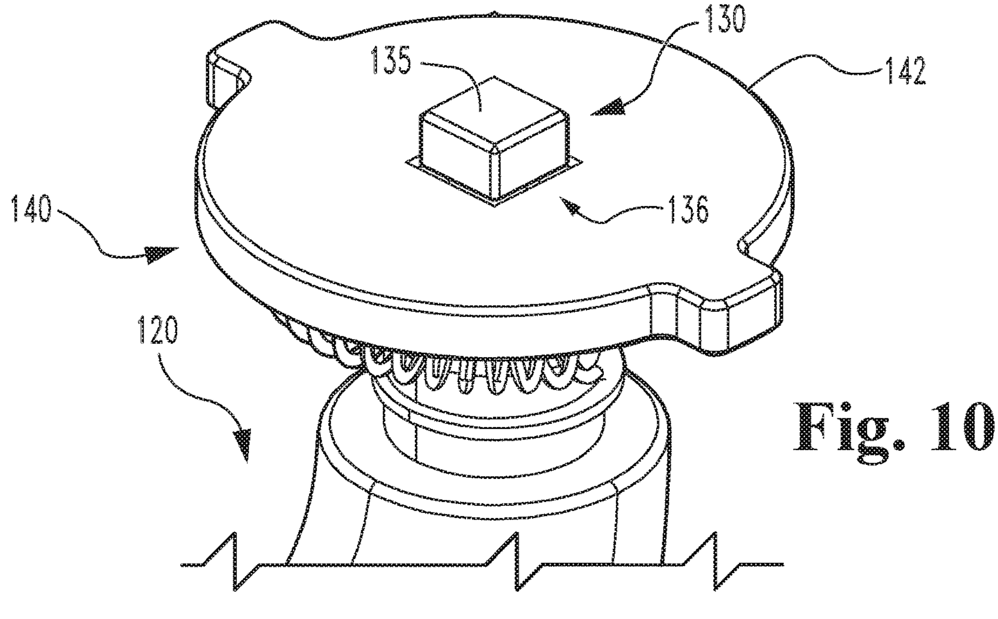
FIG. 10 is a perspective illustration of a portion of the handleset when the handleset is in the disengaged condition.

With additional reference to FIGS. 9 and 10, illustrated therein are portions of the handleset 100 with the handleset 100 in a disengaged condition, in which the spindle 130 has been moved to the proximal disengaged position. For example, a tool 90 may have been inserted via the rear side 108 of the handleset 100 to urge the spindle 130 proximally until the collar 132 abuts the shank 122. In this condition, the first engagement section 134 is removed from the spring cage opening 143 such that the spindle 130 is no longer rotationally coupled with the spring cage 142. More particularly, the spring cage opening 143 now receives the disengagement section 136, which is sized and shaped to remain disengaged from the spring cage 142. While the illustrated disengagement section 136 has a circular cross-sectional geometry, it is also contemplated that other geometries may be utilized so long as the disengagement section 136 remains rotationally decoupled from the spring cage 142 when the spindle 130 is in the disengaged position.

Like the spring cage 142, the first actuator 152 is also rotationally decoupled from the spindle 130 when the spindle 130 is in the disengaged position. More particularly, the second engagement section 135 is removed from the first actuator opening 153 such that the second engagement section 135 no longer couples the spindle 130 with the first actuator 152. Various dimensions of the spindle 130, such as the position of the collar 132, may be selected such that abutment of the collar 132 with the shank 122 prevents the second engagement section 135 from entering the spring cage opening 143 when the spindle 130 is in the disengaged position.

In the illustrated form, the handleset 100 is provided as an outside handleset configured for mounting to the exterior or outer side of a door. It is also contemplated that the handleset 100 may be provided as an inside handleset configured for mounting to the interior or inner side of a door. In such forms, various components of the illustrated handleset (e.g., the lock cylinder 104 the credential reader 106, and/or certain components of the actuation assembly 150 such as the second actuator 154 and the clutch mechanism 156) may be omitted. Moreover, while the illustrated handleset 100 is configured as a lockable handleset in which the handleset 100 is operable to selectively prevent the lever handle 120 from actuating a latchbolt mechanism 80, it is also contemplated that the handleset 100 may be provided as a passage handleset in which the lever handle 120 is always operable to actuate the latchbolt mechanism 80. Various components of the handleset 100 (e.g., the lock cylinder 104 the credential reader 106, and/or certain components of the actuation assembly 150 such as the second actuator 154 and the clutch mechanism 156) may likewise be omitted in such embodiments.

Figure 11:
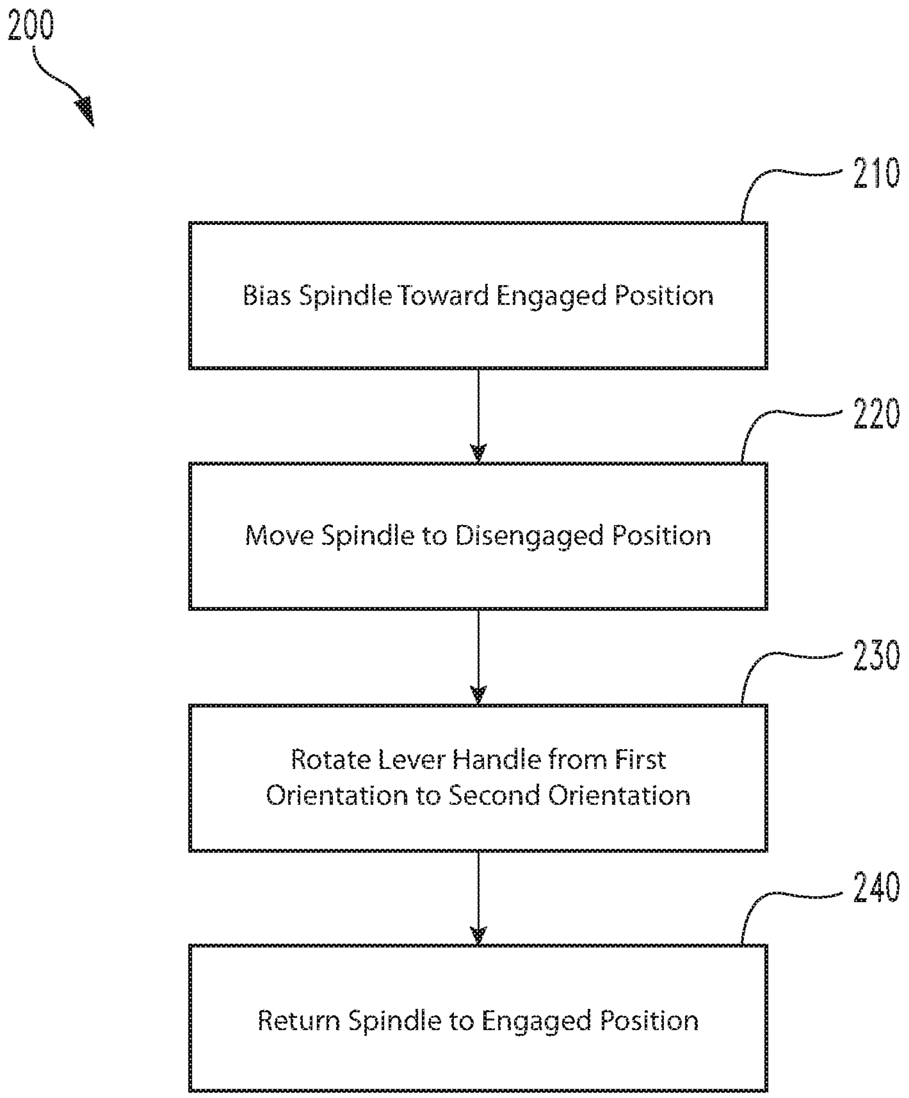
FIG. 11 is a schematic flow diagram of a process according to certain embodiments.

With additional reference to FIG. 11, an exemplary process 200 that may be performed to change the handing of a handleset such as the handleset 100 is illustrated. Blocks illustrated for the processes in the present application are understood to be examples only, and blocks may be combined or divided, and added or removed, as well as reordered in whole or in part, unless explicitly stated to the contrary. While the blocks are illustrated in a relatively serial fashion, it is to be understood that two or more of the blocks may be performed concurrently or in parallel with one another. Moreover, while the process 200 is described herein with specific reference to the handleset 100 illustrated in FIGS. 1-10, it is to be appreciated that the process 200 may be performed with handlesets having additional and/or alternative features.

The process 200 generally involves changing the handing of a handleset comprising a housing, a rotatable component rotatably mounted in the housing, a lever handle rotatably mounted on a front side of the handleset, and a spindle slidably coupled to the lever handle for movement between an engaged position and a disengaged position. For example, the process 200 may be performed with the handleset 100, which generally includes a housing 110, at least one rotatable component (e.g., the spring cage 142 and/or the first actuator 152) rotatably mounted in the housing 110, a lever handle 120 rotatably mounted on a front side 109 of the handleset 100, and a spindle 130 slidably coupled to the lever handle 120 for movement between an engaged position (FIGS. 7 and 8) and a disengaged position (FIGS. 9 and 10).

At the beginning of the process 200, the lever handle 120 may be in a first orientation, such as the right-handed orientation 121 illustrated in FIG. 1, the left-handed orientation 121' illustrated in FIG. 1, or another orientation not specifically illustrated in the Figures (e.g., a vertical orientation or an oblique orientation). Regardless of the precise orientation, the lever portion 124 may extend from the shank 122 in a particular direction corresponding to the first orientation. Additionally, the spindle 130 may be engaged with the spring cage 142 such that the spring cage assembly 140 biases the lever handle 120 toward the first orientation. More particularly, when the first orientation is selected, the biasing of the spring cage 142 to its home position by the bias mechanism 148 results in biasing of the lever handle 120 toward the first orientation.

The process 200 may include block 210, which generally involves biasing the spindle toward an engaged position in which the spindle rotationally couples the lever handle with the rotatable component. Block 210 may, for example, be performed using a bias element such as the compression spring 129 to bias the spindle 130 into engagement with a rotatable component in the form of the spring cage 142 and/or a rotatable component in the form of the first actuator 152. It is also contemplated that block 210 may involve another form of bias element, such as an extension spring, a torsion spring, a pair of magnets, and/or an elastic element. It is further contemplated that the spindle 130 may not necessarily be biased to the engaged position, in which case block 210 may be omitted from the process 200. In the illustrated form, the spindle 130 rotationally couples the lever handle 120 with each of two rotatable components (e.g., the spring cage 142 and the first actuator 152) when in the engaged position. It is also contemplated that the spindle 130 may rotationally couple the lever handle 120 with a single rotatable component when the spindle 130 is in the engaged position. For example, the spring cage 142 and the actuator 152 may be combined into a single rotatable component, or one of the spring cage 142 or the actuator 152 may not necessarily be present in certain embodiments.

The process 200 may include block 220, which generally involves moving the spindle against the biasing to a disengaged position in which the lever handle and the rotatable component are rotationally decoupled. As one example, block 220 may involve inserting a tool 90 from the rear side 108 of the handleset 100. The tool 90 may, for example, be inserted through the backplate opening 113, the second actuator opening 155, and the first actuator opening 153 until the tool 90 engages the distal end of the spindle 130. The tool 90 may then be urged proximally to move the spindle 130 proximally along the longitudinal axis 102 until the collar 132 abuts the shank 122, at which point the spindle 130 is in its disengaged position and is rotationally decoupled from the rotatable component(s) (e.g., the spring cage 142 and the first actuator 152).

The process 200 may include block 230, which may be performed at least in part while maintaining the spindle in the disengaged position, and which generally involves rotating the lever handle relative to the rotatable component from a first orientation to a second orientation different from the first orientation. As noted above, when the spindle 130 is in the disengaged position, the lever handle 120 is free to rotate relative to at least one rotatable component (e.g., the spring cage 142 and/or the first actuator 152). As such, block 230 may be performed while maintaining the spindle 130 in the disengaged position (FIGS. 9 and 10), and involve rotating the lever handle 120 relative to the spring cage 142 and the first actuator 152 from a first orientation to a second orientation different from the second orientation.

The first orientation is different from the second orientation such that the lever portion 124 extends from the shank 122 in a first direction when the lever handle 120 is in the first orientation, and extends from the shank 122 in a second direction different from the first direction when the handle 120 is in the second orientation. For example, block 230 may involve rotating the lever handle 120 about the longitudinal axis 102 from one of the right-handed orientation 121 or the left-handed illustrated in FIG. 1 to the other of the right-handed orientation 121 or the left-handed illustrated in FIG. 1. In these embodiments and others, the first and second orientations may be offset from one another by 180° such that the first and second directions are opposite one another. It is also contemplated that the first and second orientations may be offset from one another by another angle such that the first and second directions are oblique or perpendicular to one another. For example, one of the first orientation or the second orientation may be a substantially horizontal orientation, and the other of the first orientation or the second orientation may be a substantially vertical orientation.

The process 200 further includes block 240, which may be performed with the lever handle in the second orientation and which generally involves returning the spindle to the engaged position, thereby coupling the lever handle with the rotatable component. Block 240 may, for example, involve releasing the spindle such that the biasing returns the spindle to the engaged position. For example, block 240 may involve removing the tool 90 such that the biasing force of the spring 129 returns the spindle 130 to its engaged position. In embodiments in which the spindle 130 is not biased toward the engaged position, block 240 may involve returning the spindle 130 to its engaged position in another manner.

With the spindle 130 returned to its engaged position, the new or second orientation of the lever handle 120 is selected, and the spring cage assembly 140 biases the lever handle 120 toward the second orientation. More particularly, when the second orientation is selected, the biasing of the spring cage 142 to its home position by the bias mechanism 148 results in biasing of the lever handle 120 toward the second orientation.

As should be evident from the foregoing, the systems and methods described herein may provide one or more advantages over existing systems. As one example, the systems and methods described herein may obviate the need to remove the lever handle 120 in order to select the new orientation, which may facilitate the re-handing process by reducing the number and/or difficulty of the steps for rehanding. As another example, the systems and methods described herein do not necessarily require a specialized tool for re-handing the handleset 100. Instead, the handleset 100 is operable to be re-handed using a standard tool (e.g. a screwdriver) or another elongated rigid member. This feature may likewise facilitate the rehanding process, for example by enabling rehanding with tools that the user is likely to have at hand, thereby obviating the need for the manufacturer to include a special rehanding tool and the need for the user to keep track of the special rehanding tool.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A handleset, comprising:

an escutcheon;

a first rotatable component rotatably mounted in the escutcheon;

a second rotatable component rotatably mounted in the escutcheon;

a lever handle mounted for rotation relative to the escutcheon about a longitudinal axis, the lever handle comprising a shank extending along the longitudinal axis and a lever portion extending from the shank, the lever handle having a first orientation in which the lever portion extends from the shank in a first direction;

a longitudinally-extending spindle comprising a proximal end portion and a distal end portion opposite the proximal end portion, wherein the proximal end portion is slidably engaged with the shank and is rotationally coupled with the shank; and a bias element engaged with the spindle and longitudinally biasing the spindle toward an engaged position in which the distal end portion is engaged with the first rotatable component and the spindle rotationally couples the lever handle with the first rotatable component;

wherein, with the spindle in the engaged position, the distal end portion is engaged with the second rotatable component and rotationally couples the lever handle with the second rotational component;

wherein, with the distal end portion of the spindle accessible, the spindle is operable to be longitudinally moved by a longitudinal force from the engaged position to a disengaged position in which the spindle is disengaged from the first rotatable component and the lever handle is rotatable relative to the first rotatable component to a second orientation in which the lever portion extends from the shank in a second direction different from the first direction;

wherein, with the spindle in the disengaged position, the lever handle is rotatable between the first orientation and the second orientation while the lever handle remains rotationally coupled with the spindle; and wherein, with the spindle in the disengaged position, the spindle is disengaged from the second rotatable component and the lever handle is rotatable relative to the second rotatable component to the second orientation.

2. The handleset of claim 1, wherein, with the lever handle in the second orientation, the bias element returns the spindle to the engaged position, thereby coupling the lever handle with the rotatable component.

3. The handleset of claim 1, further comprising an actuator assembly comprising the first rotatable component; and wherein the actuator assembly is operable to actuate a latchbolt mechanism in response to rotation of the first rotatable component.

4. The handleset of claim 1, further comprising a spring cage assembly comprising the first rotatable component and a bias mechanism, the bias mechanism urging the first rotatable component toward a home position, thereby urging the lever handle toward a selected one of the first orientation or the second orientation when the spindle is in the engaged position.

5. The handleset of claim 1, wherein the spindle further comprises a collar formed between the proximal end portion and the distal end portion; and wherein the collar abuts another component of the handleset when the spindle is in the disengaged position to prevent movement of the spindle beyond the disengaged position.

6. The handleset of claim 1, further comprising:

a spring cage assembly comprising the first rotatable component and a bias mechanism urging the first rotatable component toward a home position, thereby urging the lever handle toward a selected one of the first orientation or the second orientation when the spindle is in the engaged position; and an actuator assembly comprising the second rotatable component, the actuator assembly operable to actuate a latchbolt mechanism in response to rotation of the second rotatable component.

7. The handleset of claim 1, wherein the distal end portion comprises a first engagement section, a second engagement section, and a disengagement section positioned between the first engagement section and the second engagement section;

wherein the first engagement section is rotationally coupled with the first rotatable component when the spindle is in the engaged position;

wherein the second engagement section is rotationally coupled with the second rotatable component when the spindle is in the engaged position; and wherein the disengagement section is aligned with the first rotatable component when the spindle is in the disengaged position and remains rotationally decoupled from the first rotatable component when the spindle is in the disengaged position.

8. A handleset, comprising:

a housing;

a spring cage assembly, comprising:

a spring cage rotatably mounted in the housing; and a bias mechanism biasing the spring cage toward a home position;

a spindle extending along a longitudinal axis, wherein the spindle is longitudinally movable between an engaged position in which the spindle is rotationally coupled with the spring cage and a disengaged position in which the spindle is rotationally decoupled from the spring cage; and a lever handle rotationally coupled with the spindle;

wherein the spindle is slidable relative to the lever handle between the engaged position and the disengaged position when a distal end portion of the spindle is accessible to be acted on by a longitudinal force;

wherein the lever handle is rotationally coupled with the spindle both when the spindle is in the engaged position and when the spindle is in the disengaged position; and wherein the spindle comprises a collar that abuts another component of the handleset when the spindle is in the disengaged position to prevent movement of the spindle beyond the disengaged position.

9. The handleset of claim 8, further comprising an actuator rotatably mounted in the housing;

wherein, with the spindle in the engaged position, the spindle is rotationally coupled with the actuator; and wherein, with the spindle in the disengaged position, the spindle is rotationally decoupled from the actuator.

10. The handleset of claim 9, wherein, with the spindle in the disengaged position, the lever handle is rotatable relative to the actuator and the spring cage between a first orientation and a second orientation;

wherein, with the spindle in the engaged position, the lever handle is rotationally coupled with the actuator such that rotation of the lever handle from a selected one of the first orientation or the second orientation causes a corresponding rotation of the actuator; and wherein, with the spindle in the engaged position, the lever handle is rotationally coupled with the spring cage such that the spring cage assembly biases the lever handle to the selected one of the first orientation or the second orientation.

11. The handleset of claim 9, wherein the spindle includes a first engagement section, a second engagement section, and a disengagement section positioned between the first engagement section and the second engagement section;

wherein the first engagement section is rotationally coupled with the spring cage when the spindle is in the engaged position;

wherein the second engagement section is rotationally coupled with the actuator when the spindle is in the engaged position; and wherein the disengagement section is aligned with the spring cage when the spindle is in the disengaged position and remains rotationally decoupled from the spring cage when the spindle is in the disengaged position.

12. The handleset of claim 8, wherein the lever handle is rotatably coupled with the housing.

13. The handleset of claim 8, wherein the spindle is biased toward the engaged position.

14. The handleset of claim 8, wherein the spindle is accessible via a rear side of the handleset such that an inserted tool is operable to move the spindle from the engaged position to the disengaged position.

15. The handleset of claim 8, wherein the spindle further comprises a proximal end portion operable to engage the spring cage; and wherein the collar is formed between the distal end portion and the proximal end portion.

16. A method of changing a handing of a handleset comprising a housing, a rotatable component rotatably mounted in the housing, a lever handle rotatably mounted on a front side of the handleset, and a spindle slidably coupled to the lever handle for movement between an engaged position and a disengaged position, the method comprising:

biasing the spindle toward an engaged position in which the spindle rotationally couples the lever handle with the rotatable component;

with a distal end portion of the spindle accessible, applying a longitudinal force to the distal end portion to thereby move the spindle against the biasing to a disengaged position in which the lever handle and the rotatable component are rotationally decoupled, wherein the lever handle is rotationally coupled with the spindle when the spindle is in the disengaged position;

engaging a collar of the spindle with the lever handle to thereby prevent movement of the spindle beyond the disengaged position;

while maintaining the spindle in the disengaged position, rotating the lever handle relative to the rotatable component from a first orientation to a second orientation different from the first orientation; and with the lever handle in the second orientation, releasing the spindle such that the biasing returns the spindle to the engaged position, thereby coupling the lever handle with the rotatable component.

17. The method of claim 16, wherein the handleset has a rear side opposite the front side; and wherein the moving comprises inserting a tool from the rear side of the handleset through the rotatable component to engage the spindle.

18. The method of claim 16, further comprising biasing the rotatable component toward a home position;

wherein, with the lever handle coupled to the rotatable component in the first orientation, biasing the rotatable component toward the home position biases the lever handle toward the first orientation; and wherein, with the lever handle coupled to the rotatable component in the second orientation, biasing the rotatable component toward the home position biases the lever handle toward the second orientation.

19. The method of claim 16, wherein rotating the lever handle from the first orientation to the second orientation comprises rotating the lever handle about a longitudinal axis; and wherein moving the spindle against the biasing comprises moving the spindle in a longitudinal direction.

20. A handleset, comprising:

an escutcheon;

a first rotatable component rotatably mounted in the escutcheon;

a second rotatable component rotatably mounted in the escutcheon;

a handle mounted for rotation relative to the escutcheon; and a spindle extending in a longitudinal direction, the spindle comprising a proximal end portion and a distal end portion, wherein the proximal end portion is rotationally coupled with the handle and is operable to be longitudinally moved relative to the handle between an engaged position and a disengaged position when the distal end portion is accessible;

wherein, with the spindle in the engaged position, the proximal end portion is rotationally coupled with the handle, and the distal end portion is engaged with each of the first rotatable component and the second rotatable component to thereby rotationally couple the lever handle with each of the first rotatable component and the second rotatable component; and wherein, with the spindle in the disengaged position, the proximal end portion is rotationally coupled with the handle, and the distal end portion is rotationally decoupled from each of the first rotatable component and the second rotatable component such that the handle is rotatable relative to the first rotatable component and the second rotatable component between a first orientation and a second orientation.

21. The handleset of claim 20, wherein the distal end portion comprises:

a first engagement section operable to engage the first rotatable component when the spindle is in the engaged position;

a second engagement section operable to engage the second rotatable component when the spindle is in the engaged position; and a disengagement section positioned between the first engagement section and the second engagement section, wherein the disengagement section is aligned with the first rotatable component when the spindle is in the disengaged position and remains rotationally decoupled from the first rotatable component when the spindle is in the disengaged position.

22. The handleset of claim 20, further comprising a spring cage, the spring cage comprising the first rotatable component and a spring biasing the first rotatable component to a home position.

23. The handleset of claim 22, further comprising a bolt mechanism connected with the second rotatable component such that rotation of the second rotatable component actuates the bolt mechanism.

24. The handleset of claim 20, further comprising a bolt mechanism connected with the second rotatable component such that rotation of the second rotatable component actuates the bolt mechanism.

* * * * *